(12) United States Patent
McKeigue et al.

(10) Patent No.: US 6,713,158 B2
(45) Date of Patent: Mar. 30, 2004

(54) STRUCTURED PACKING

(75) Inventors: Kevin McKeigue, Berkeley Heights, NJ (US); Ramachandran Krishnamurthy, Chestnut Ridge, NY (US); Nancy Irwin, Summit, NJ (US); Hendrik Jekeli Kooijman, Tuebingen (DE)

(73) Assignee: The BOC Group, Inc., Murray Hill, NJ (US)

( * ) Notice: Subject to any disclaimer, the term of this patent is extended or adjusted under 35 U.S.C. 154(b) by 11 days.

(21) Appl. No.: 09/746,094

(22) Filed: Dec. 22, 2000

(65) Prior Publication Data

US 2003/0190461 A1 Oct. 9, 2003

Related U.S. Application Data

(63) Continuation-in-part of application No. 09/593,051, filed on Jun. 13, 2000, now Pat. No. 6,509,082, and a continuation-in-part of application No. 09/344,647, filed on Jun. 25, 1999, now Pat. No. 6,280,819.

(51) Int. Cl.[7] ................. B32B 3/28; F25J 3/00
(52) U.S. Cl. ............... 428/184; 428/137; 261/112.2; 261/DIG. 72; 62/617; 62/620
(58) Field of Search ................. 428/182, 184, 428/137; 261/112.2, 100, 105, DIG. 72; 62/600, 617, 620

(56) References Cited

U.S. PATENT DOCUMENTS

| | | | |
|---|---|---|---|
| 4,186,159 A | 1/1980 | Huber | 261/112 |
| 4,597,916 A | 7/1986 | Chen | |
| 4,623,454 A | 11/1986 | Tauscher et al. | 210/150 |
| 4,871,382 A | 10/1989 | Thorogood et al. | |
| 5,028,356 A | 7/1991 | Wiltz | 261/109 |
| 5,350,566 A | 9/1994 | Stingaro | |
| 5,474,832 A | 12/1995 | Massey | |
| 5,498,376 A | 3/1996 | Louis et al. | 261/113 |
| 5,632,934 A | 5/1997 | Billingham et al. | |
| 5,921,109 A | 7/1999 | Billingham et al. | |
| 6,000,685 A | 12/1999 | Groten et al. | 261/112.2 |
| 2002/0142130 A1 | 10/2002 | Irwin et al. | 428/137 |

FOREIGN PATENT DOCUMENTS

| | | | |
|---|---|---|---|
| EP | 0 036 944 A | 10/1981 | |
| EP | 0 151 693 A1 | 8/1985 | B01D/53/18 |
| EP | 662 515 A5 | 10/1987 | B01D/3/24 |
| EP | 858 366 B1 | 7/2000 | |
| WO | WO 97/16247 | 5/1997 | |

OTHER PUBLICATIONS

"Distillation Columns Containing Structured Packing", by Fair et al., *Chemical Engineering Progress*, No. 1, New York, pp. 19–29 (Jan. 1990).
"Packed Column Internals", by G. K. Chen, Chemical Engineering, pp. 40–51 (Mar. 5, 1984).
Spiegel et al., "Structured Packings Today and Tomorrow," AICHE Spring Meeting Mar. 5–9, 2000, Atlanta GA.
Z. Olujic, "Stretching The Capacity of Structured Packing," American Institute of Chemical Engineers (AICHE) Annual Meeting Nov. 14, 2000, Los Angeles California.

*Primary Examiner*—Donald J. Loney
(74) *Attorney, Agent, or Firm*—Philip H. Von Neida

(57) ABSTRACT

A structured packing with improved packing elements and method of using the structured packing. Each structured packing element comprises corrugated sheets and planar members alternating with and located between the corrugated sheets The planar members are positioned so that at least the lowermost horizontal edges of the planar members and the corrugated sheets are situated proximal to one another. Perforations provided in the planar members and the corrugated sheets are designed to avoid turbulent flows and bulk fluid flow across the packing element while allowing transverse pressure equalization. Different configurations of corrugated sheets may be used with the planar members to form the structured packing.

14 Claims, 6 Drawing Sheets

STRUCTURED PACKING

RELATED APPLICATIONS

This application is a continuation-in-part of U.S. patent application Ser. No. 09/344,647, entitled "Structured Packing," filed Jun. 25, 1999, now U.S. Pat. No. 6,280,819 and of U.S. patent application Ser. No. 09/593,051, entitled "Structured Packing," filed Jun. 13, 2000, now U.S. Pat. No. 6,509,082 both of which are herein incorporated by reference in their entirety.

FIELD OF THE INVENTION

The present invention relates generally to structured packings, and more particularly, to structured packing elements and applications to method of cryogenic separation.

BACKGROUND OF THE INVENTION

Structured packings have found widespread use in a variety of distillations including those involved in the separation of air into its component parts. Distillations are conducted within distillation columns filled with mass transfer elements to bring ascending vapor phases into intimate contact with descending liquid phases of mixtures to be separated. As the ascending phase rises and contacts the descending liquid phase, it becomes evermore enriched in the more volatile components of the mixture to be separated. At the same time, the descending liquid phase becomes ever more concentrated in the less volatile components of the mixture to be separated. In such fashion, systems of distillation columns can be used to separate various mixture components. For instance, in case of air separation, nitrogen is separated from oxygen in a double distillation column unit. Argon is then separated from oxygen in an argon column that is attached to a lower pressure column of such a double distillation column unit.

Structured packings are widely used as mass transfer elements within distillation columns due to their low pressure drop characteristics. Structured packings generally include a series of structured packing elements that are made up of a number of corrugated sheets of material, in which the sheets are placed in a side by side relationship with the corrugations of adjacent sheets criss-crossing one another. In use, the liquid phase of the mixture to be separated is distributed to the top of the packing and spreads out throughout the packing as a descending film. The vapor phase of such a mixture rises through the corrugations contacting the liquid film as it descends.

There have been many attempts in the prior art to increase the efficiency of structured packings, that is, to decrease the height of packing equal to a theoretical plate (HETP). Obviously, the lower the height, the more efficient the packing. At the same time, a structured packing with a low HETP inherently has an increased pressure drop over less efficient packings. One such structured packing is disclosed in U.S. Pat. No. 4,597,916 in which the corrugated sheets are separated from one another by flat, perforated sheets that extend throughout the packing. It is believed that the flat perforated sheets of this prior packing increase efficiency by both providing additional interfacial area for vapor-liquid contact and by increasing turbulence in the vapor flow and therefore the degree of mixing between vapor and liquid phases. Other approaches to improving the performance of structured packings have also been disclosed in U.S. Pat. No. 5,632,934 and EP 858,366B1, which involve modifying the configurations of corrugations close to the interfaces between adjacent structured packing elements. It is believed that such modifications lead to improved performance by reducing the pressure drop between adjacent packing elements. However, there is still an ongoing need for alternative designs of structured packings for improving capacity without significant sacrifice in the separation efficiency, and vice versa.

SUMMARY OF THE INVENTION

The present invention provides generally a structured packing with improved capacity without significant loss of separation efficiency and a method of cryogenic separation using the structured packing. In one embodiment, a structured packing of the present invention contains packing elements comprising an array of vertically oriented corrugated sheets, and one or more planar members located between at least one pair of adjacent corrugated sheets. At least some of the corrugated sheets have corrugations in the middle portion with angles of inclination from horizontal that are smaller than angles of inclination in at least one of the top and bottom portions of the corrugated sheets. The one or more planar members and the corrugated sheets are positioned such that at least one outermost horizontal edge of each planar member is proximal to a horizontal edge of the adjacent corrugated sheets. Another aspect of the invention provides a method of cryogenic separation using such a structured packing.

Other embodiments relate to structured packing elements comprising corrugated sheets that have differences in configurations between a middle portion and at least a top or a bottom portion of the corrugated sheet, and one or more planar members positioned between at least one pair of adjacent corrugated sheets. Corrugations in the middle portion of each corrugated sheet are characterized by a corrugation height and a corrugation width. The planar members are positioned such that an outermost horizontal edge of each planar member is proximal to a horizontal edge of the adjacent corrugated sheets, and each planar member has a length that is equal to at least two times the corrugation width of adjacent corrugated sheets.

One specific embodiment relates to a structured packing element with planar members used in conjunction with corrugated sheets having corrugations whose angles of inclination at the middle portion of the corrugated sheet are less than 90 degrees, while those at the top and bottom portions increase progressively to about 90 degrees. Another specific embodiment relates to a structured packing element with planar members used in conjunction with corrugated sheets having rectilinear corrugations at the middle portions with angles of inclination less than 90° (typically from about 30° to about 60°), while those at the bottom portions have angles of inclination about 90°. In both embodiments, the two planar members located between each pair of adjacent corrugated sheets both have a length that is equal to at least two times the corrugation width of an adjacent corrugated sheet.

BRIEF DESCRIPTION OF THE DRAWINGS

While the specification concludes with claims distinctly pointing out the subject matter that the applicants regard as their invention, it is believed the invention would be better understood when taken in connection with the accompanying drawings in which:

FIG. 4b is a side elevational view of the embodiment of FIG. 4a;

FIG. 7b is a side elevational view of the embodiment of FIG. 7a;

FIG. 10b is a side view of an embodiment comprising a planar member and corrugated sheets of FIG. 10a.

DETAILED DESCRIPTION

The present invention relates to an improved structured packing designed for increased capacity by reducing turbulent vapor flows. Such a structured packing can be used in a more efficient, cost effective manner in cryogenic separations because the improvement in capacity can be achieved without significant decrease in separation efficiency. Although various aspects of the structured packing will be illustrated as they pertain to air separation, the improved structured packing is generally applicable to a variety of other distillation applications.

Figure 1:
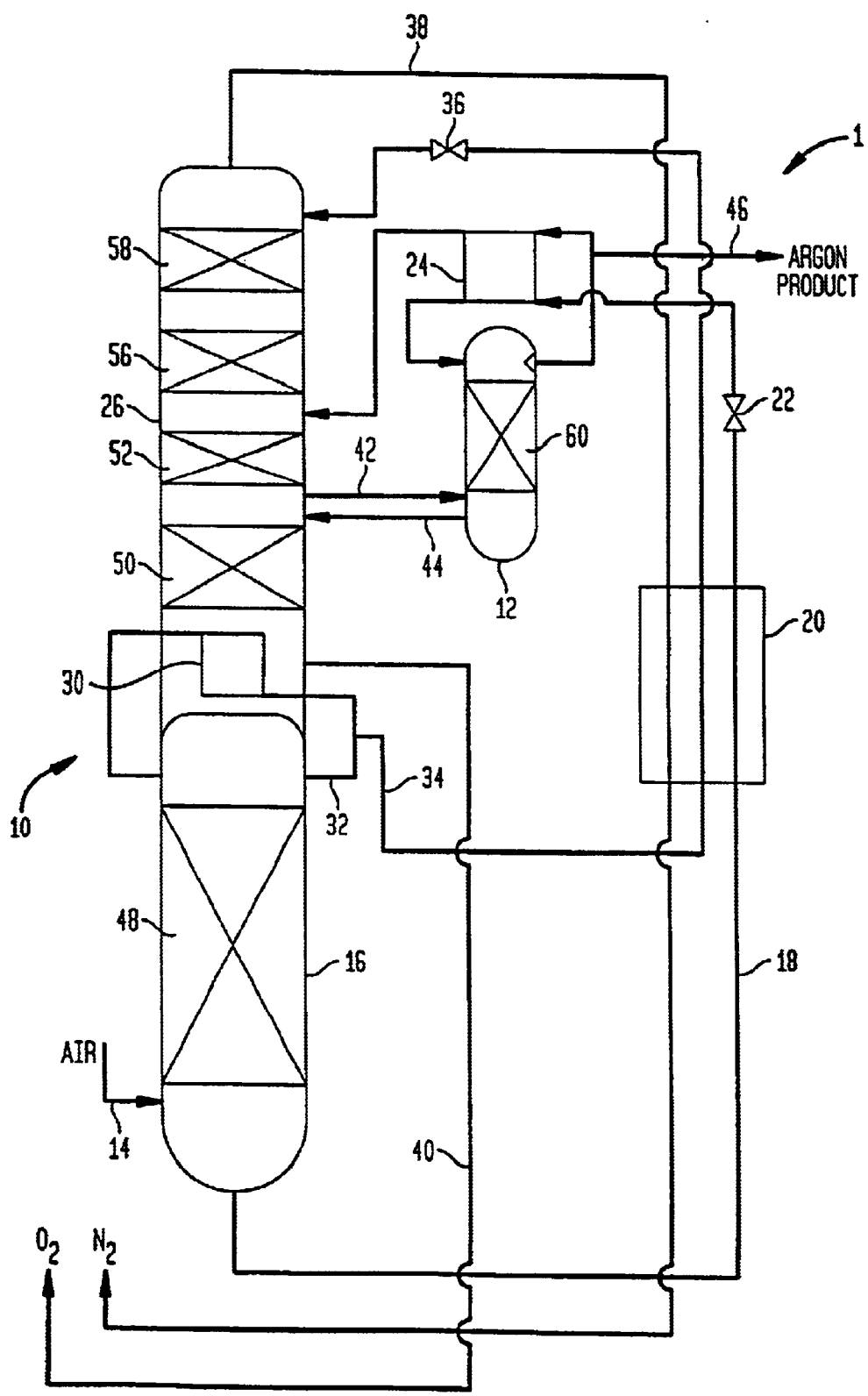
FIG. 1 is a schematic view of an air separation plant utilizing a structured packing comprising structured packing elements in accordance with the present invention.

FIG. 1 is a schematic illustration of an air separation plant 1. Air separation plant 1 has a double distillation column unit 10 and an argon column 12. Although not illustrated, but as would be known by those skilled in the art, air separation plant 1 would additionally have a main heat exchanger to cool the air to a rectification temperature against warming product streams to ambient temperatures. Additionally, a main air compressor and a pre-purification unit would also be provided to compress the air and then to purify the compressed air of impurities such as carbon dioxide and moisture.

Air as a feed stream 14 enters a higher pressure column 16 of double distillation column unit 10 where it is rectified to produce a nitrogen rich tower overhead and a crude liquid oxygen column bottoms. Stream 18 of the crude liquid oxygen column bottoms is subcooled within a subcooling unit 20 and then expanded across an expansion valve 22. The expansion reduces the temperature of stream 18 so that it can serve as coolant for a head condenser 24 used to form reflux for an argon column 12. The crude liquid oxygen obtained within stream 18 is vaporized within head condenser 24 and then fed into a lower pressure column 26 (of double distillation column unit 10) for further refinement. The further refinement produces an oxygen-enriched column bottoms and a nitrogen vapor tower overhead within the lower pressure column 26.

Reflux for both the higher and lower pressure columns 16 and 26 is provided by condensing the nitrogen-rich tower overhead within a condenser reboiler 30 to produce higher and lower pressure column reflux streams 32 and 34. Lower pressure reflux stream 34 is subcooled within subcooling unit 20 and reduced in pressure by expansion valve 36 prior to its introduction into lower pressure column 26. The nitrogen vapor tower overhead is removed as a nitrogen stream 38 which serves in subcooling unit 22 to subcool stream 18 and lower pressure column reflux stream 34. An oxygen product stream 40 may be removed as a liquid from a bottom region of lower pressure column 26. Both the nitrogen stream 38 and the oxygen product stream 40 may be introduced into the main heat exchanger for cooling the incoming air.

At an intermediate location of lower pressure column 26, an argon rich vapor stream 42 may be removed and introduced into argon column 12. An argon rich tower overhead is produced within argon column 12. An oxygen rich column bottoms is also produced which is returned as a liquid stream 44 back to lower pressure column 26. An argon product stream 46 may be removed from part of the condensate of head condenser 24.

In order to effectuate the distillation, ascending vapor phases and descending liquid phases must be brought into contact with one another by mass transfer elements. For instance, higher pressure column 16 is provided with transfer elements 48 which may be trays or structured packings. As vapor rises within mass transfer elements 48, it becomes ever more rich in nitrogen until it reaches the top of higher pressure column 16. There, the vapor is condensed and in part returned as higher pressure column reflux stream 32 to higher pressure column 16. The nitrogen rich tower overhead, as a liquid, descends within higher pressure column 16 and becomes ever more richer in oxygen, through contact with the ascending vapor, to produce the crude liquid oxygen column bottoms.

Vapor rising within lower pressure column 26 passes through beds 50, 52, 56 and 58 which are formed of structured packing. The ascending vapor phase, initiated by boiling the oxygen rich liquid, rises through the column and becomes ever more rich in nitrogen to form the nitrogen vapor tower overhead. The descending liquid phase is initiated by the reflux of higher pressure column stream 34. This liquid becomes ever more rich in oxygen as it descends.

Argon column 12 is provided with mass transfer elements 60 which again, are a structured packing. The vapor phase initiated by introduction of argon rich vapor stream 42 becomes ever more rich in argon. The reflux introduced into the top of argon column 12 becomes ever more rich in oxygen as it descends.

Figure 2:
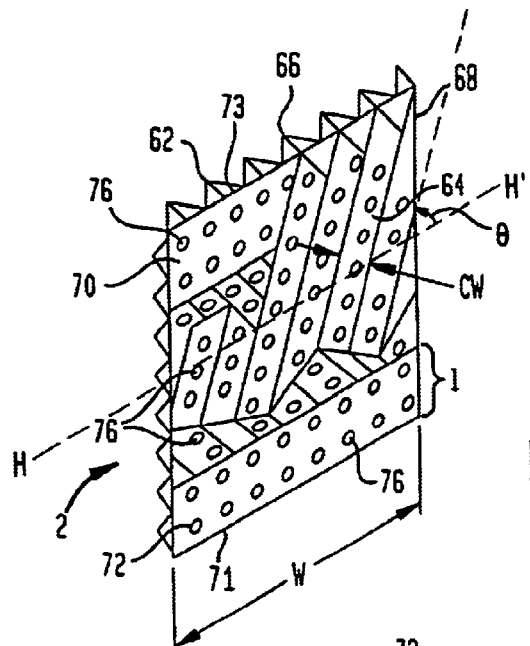
FIG. 2 is a fragmentary view of a structured packing element in accordance with one embodiment of the present invention for use in the air separation plant illustrated in FIG. 1.
Figure 3:
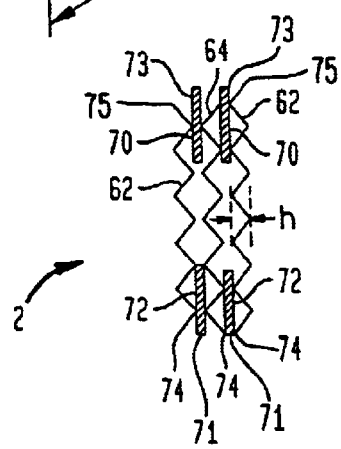
FIG. 3 is a fragmentary, side elevational view of the structured packing element shown in FIG. 2.

FIGS. 2–3 illustrate two fragmentary views—a perspective view and a side elevational view, of a structured packing element 2 in accordance with one embodiment of the present invention. The structured packing element 2 comprises a plurality of corrugated sheets 62 and 64 arranged in a face to face relationship with each other, which may also be referred to as an array of corrugated sheets, and two planar members 70 and 72 disposed between and in contact with adjacent corrugated sheets 62 and 64. As used herein, the planes of the corrugated sheets 62 and 64 define a vertical orientation, which corresponds to one as viewed when the structured packing element 2 is in use within a distillation column. While the structured packing element 2 shown in FIGS. 2–3 is fabricated from rectangular corrugated sheets, other shapes can be used as evident to one skilled in the art. The repetition of corrugated sheets 62 and 64 and planar members 70 and 72 produce a structured packing element within a bed of packing. In general, planar members 70 and 72 may be held in place within the structured packing element 2 by a variety of means such as welding, fastening with the aid of pins or clips, or through frictional forces between the planar members 70 and 72 and the adjacent corrugated sheets 62 and 64 which occur when the packing element 2 is compressed either by pins or a metal band around the perimeter of the packing element 2. Each of the corrugated sheets 62 and 64 contains a plurality of corrugations, some of which are shown as corrugations 66 and 68, respectively.

In general, corrugations within one corrugated sheets of the structured packing element 2 have similar cross-sectional shapes, dimensions and angular orientations. Referring to FIG. 3, corrugations 68 may be characterized by a corrugation height h, representing the distance between a peak and a trough of corrugations 68, as measured perpendicular to a vertical plane of the corrugated sheet. In addition, each corrugation is characterized by a corrugation width (CW), defined as the distance between two successive peaks or two successive troughs of the corrugation, as measured perpendicular to the longitudinal axis of the corrugation. Furthermore, corrugations 66 and 68 have longitudinal axes inclined at an angle with respect to a horizontal axis HH', defining an angle of inclination or a slope θ, as shown in FIG. 2. This angle of inclination θ, may for instance be about 60° or 45°, or even smaller in other appropriate applications. In forming the structured packing element 2, corrugated sheets 62 and 64 are positioned so that corrugations 66 and 68 criss-cross one another.

As shown in FIGS. 2–3, planar members 70 and 72 alternate with and are positioned between corrugated sheets 62 and 64. In one embodiment, each of the planar members 70 and 72 has a width "W" (alternatively, a horizontal extent) equal to the widths of corrugated sheets 62 and 64 and a length "l" (alternatively, a vertical extent) less than those of corrugated sheets 62 and 64. As used herein, the length dimension is measured parallel to a longitudinal axis of the distillation column in which the structured packing element is used, i.e., along a vertical direction.

While at least one planar member must be present, this embodiment illustrates the use of two planar members in an upper and lower strip configuration as viewed when the structured packing element 2 is in use—i.e., with the planes of the corrugated sheets 62 and 64 defining a substantially vertical orientation. In a preferred embodiment, the planar members 70 and 72 have the same dimensions as each other. Furthermore, planar members 70 and 72 are preferably arranged symmetrically in the vertical direction, e.g., about equidistant from a horizontal plane containing central points of the corrugated sheets 62 and 64.

The side view in FIG. 3 shows that lowermost horizontal edges 71 of the lower planar members 72 are generally aligned to be proximal to the lower horizontal edges 74 of corrugated sheets 62 and 64, while the uppermost horizontal edges 73 of the upper planar members 70 are generally aligned to be proximal to the upper horizontal edges 75 of corrugated sheets 62 and 64. It is understood, however, that such alignment includes situations where the horizontal edges of adjacent planar members and corrugated sheets are flush with each other, as well as those in which there might be some misalignment, e.g., in the nature of about 5 mm. As such, the lowermost and uppermost horizontal edges (alternatively referred to as outermost horizontal edges) of the planar members in any embodiment are situated at least near or proximal to those of corrugated sheets 62 and 64, and the words "proximal to" includes an alignment in which the horizontal edges of the planar members and the corrugated sheets are either flush with or near each other.

Generally, the widths of the planar members 70 and 72 will be substantially the same as the corrugated sheets 66 and 68. However, depending on the specific applications, it is also possible that planar members may have widths that are different from those of the corrugated sheets. Furthermore, the lengths of the planar members 70 and 72 are preferably less than about one third, more preferably less than about one fifth, of those of the corrugated sheets. According to embodiments of the invention, planar members 70 and 72 have a length ranging from about 2 to about 8 times the corrugation width CW of adjacent corrugated sheets. The corrugation width may generally range from about 5 mm to about 15 mm. Preferably, the planar members 70 and 72 have lengths that are about 5 times the corrugation width.

As shown in FIG. 2, corrugated sheets 62 and 64 and planar members 70 and 72 are provided with perforations 76. However, depending on the lengths of the planar members 70 and 72, perforations 76 may or may not be present. For example, when the lengths of planar members 70 and 72 are less than about one-third the lengths of adjacent corrugates sheets 62 and 64, perforations 76 are normally not necessary. These perforations are employed to prevent or minimize transverse vapor and liquid flows while allowing pressure equalization across planar members 70 and 72 and corrugated sheets. That is, perforations 76 have diameters that are small enough to minimize bulk fluid flows in the horizontal direction across the planar members, but are sufficiently large to allow a small amount of vapor flow necessary to achieve pressure equalization across planar members and corrugated sheets. For example, in typical air separation applications, perforations 76 may have diameters ranging from about 1 mm to about 5 mm.

According to embodiments of the invention, perforations within each planar member or within each corrugated sheet are designed to have the same dimensions. Although the perforations are usually arranged in some regular or periodic manner, such an arrangement is not absolutely necessary. In one embodiment, perforations in the corrugated sheets 62 and 64 have the same dimensions as those provided in planar members 70 and 72. However, the use of differently sized perforations in the upper planar member 70 and the lower planar member 72 is not precluded. Perforations in the planar members may also have dimensions different from those provided in the corrugated sheets 62 and 64.

In addition, perforations 76 provided in planar members 70 and 72 or in corrugated sheets 62 and 64 are designed in the present invention to minimize turbulent vapor flows. For example, turbulence can be minimized by limiting the size of the perforations and by providing perforations with relatively smooth edges. As such, protrusions above the plane of the planar members or corrugated sheets beyond that of residual burr from the manufacture process should be avoided. As previously mentioned, the perforations are also designed to allow pressure equalization across the planar members or corrugated sheets while minimizing or preventing bulk fluid flows in a transverse direction. Thus, the present invention allows the use of single-sized perforations to accomplish different desired flow characteristics within a structured packing element. The feasibility of using single-sized perforations for all planar members and corrugated sheets provide a benefit in ease of fabrication and reduced cost. It is noted that the use of circular perforations in the figures is meant for illustrative purposes, and that perforations of different shapes, e.g., rectangular, square or triangular, may also be used for practicing embodiments of the invention.

Figure 4A:
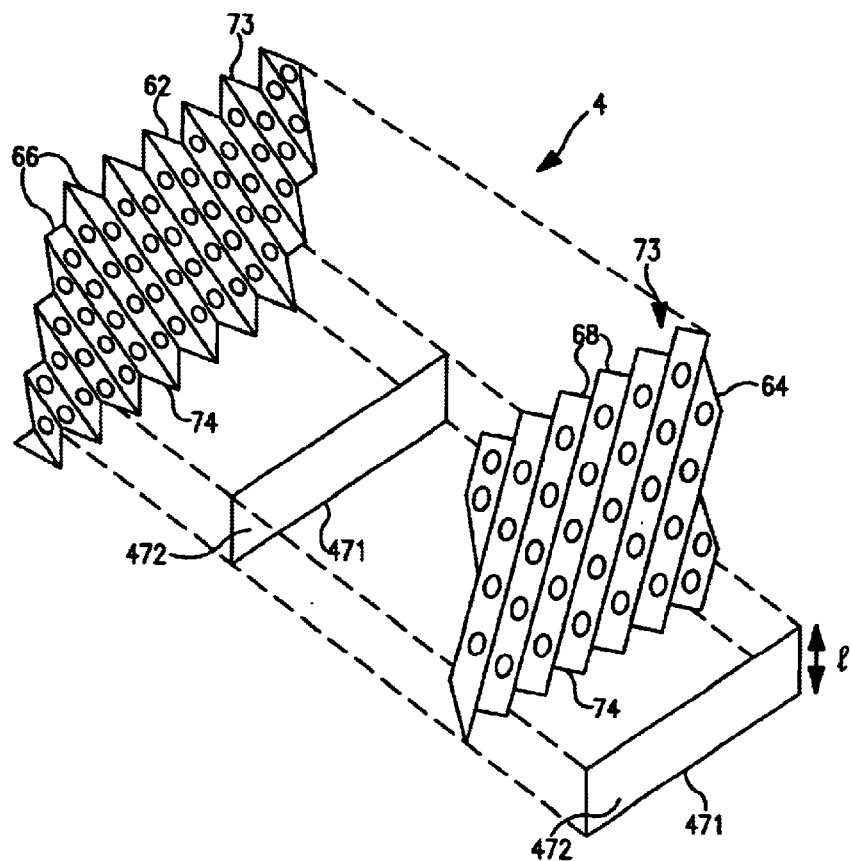
FIG. 4a is a partial exploded view of an alternative embodiment of a structured packing element incorporating one planar member in accordance with the present invention.
Figure 4B:
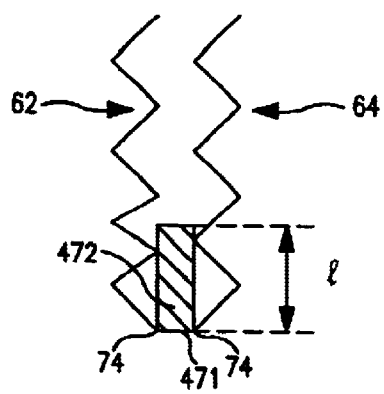

Although two planar members 72 and 70 are illustrated in FIG. 2, the present invention further encompasses embodiments in which either upper planar members 70 or lower planar members 72 are omitted. FIGS. 4a–b show respectively a partial exploded view and a side elevational view of such a structured packing element 4 in which the planar members 472 are positioned so that the lowermost horizontal edges thereof, i.e., horizontal edges 471, are aligned proximal to the lower horizontal edges 74 of adjacent corrugated sheets 62 and 64. Although this embodiment shows planar members 472 as not having any perforations, the use of planar members having perforations is also acceptable. The planar members 472 generally have a length (l) less than those of adjacent corrugated sheets 62 and 64. Preferably, the length of the planar members is less than about one third, and more preferably less than about one fifth, of those of adjacent corrugated sheets 62 and 64. In some applications, the use of planar members in the upper configuration (not shown)—i.e., having an uppermost horizontal edge proximal to the upper horizontal edges 73 of corrugated sheets 62 and 64, may also be desirable.

Figure 5:
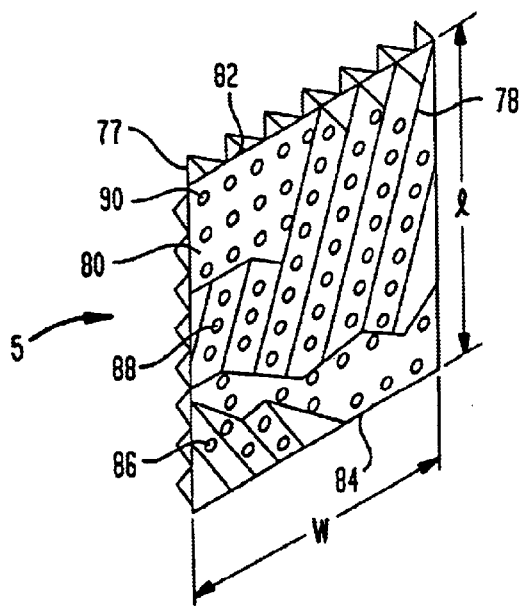
FIG. 5 is a partial perspective view of an alternative embodiment of a structured packing element incorporating a single planar member between corrugated sheets.

FIG. 5 is a schematic illustration of yet another embodiment of the invention, showing a partial perspective view of a structured packing element 5. Specifically, the structured packing element 5 is of the type having repeating pairs of corrugated sheets 77 and 78 separated by or alternating with a planar member 80, which has uppermost and lowermost edges 82 and 84 that are proximal to the uppermost and lowermost edges of corrugated sheets 77 and 78. The planar member 80 have lengths and widths substantially equal to those of corrugated sheets 77 and 78. Additionally, corrugated sheets 77 and 78 and planar members 80 are provided with perforations 86, 88 and 90. In this embodiment, perforations 86, 88 and 90 must be present. As previously discussed, these perforations 86, 88 and 90 are sized to prevent or minimize undesirable transverse liquid and vapor flows or bulk fluid flows across the structured packing element 5, while permitting pressure equalization. In such manner, smooth rather than turbulent vapor flows are promoted to produce the advantageous operation described above. In case of air separation, each of the perforations 86, 88 and 90 can be designed to have a diameter in a range of between about 5% and about 40% of a channel width or corrugation width "CW" as shown in FIG. 2. (The channel width is the distance between the corrugations from trough to trough or from peak to peak, measured perpendicularly to the longitudinal axis of the corrugations.) The perforation diameter is more preferably between about 10% and about 25% of the channel width CW and is most preferably about 15% of the channel width CW. For example, perforations 86, 88 and 90 having diameters between about 1 mm and about 5 mm have been used in a structured packing element in an argon separation column.

The planar members and corrugated sheets can be made from several different materials including metals and metal alloys, plastics, ceramics, or composite materials, depending on the application of use. For air separation applications, the materials should also be compatible with the low temperature environment such that they do not become brittle upon being cooled to cryogenic temperatures. Examples of suitable materials of construction include aluminum, copper, stainless steel, nickel and copper-nickel alloys, among others. In addition, the planar members can be textured or smooth and made from solid sheets, woven materials or knitted materials. Generally, the planar members are made from the same materials as the corrugated sheets.

A further optimization for air separation is to control the number of perforations and therefore, their open area contribution. Preferably, perforations 86, 88 and 90 can constitute an open area of the corrugated sheets 77 and 78 and the planar member 80 in a range of between about 5% and about 20% of a total area thereof. More preferably such open area can be between about 7% and about 15% of the total area and most preferably, the open area is about 10% of the total area.

Figure 6:
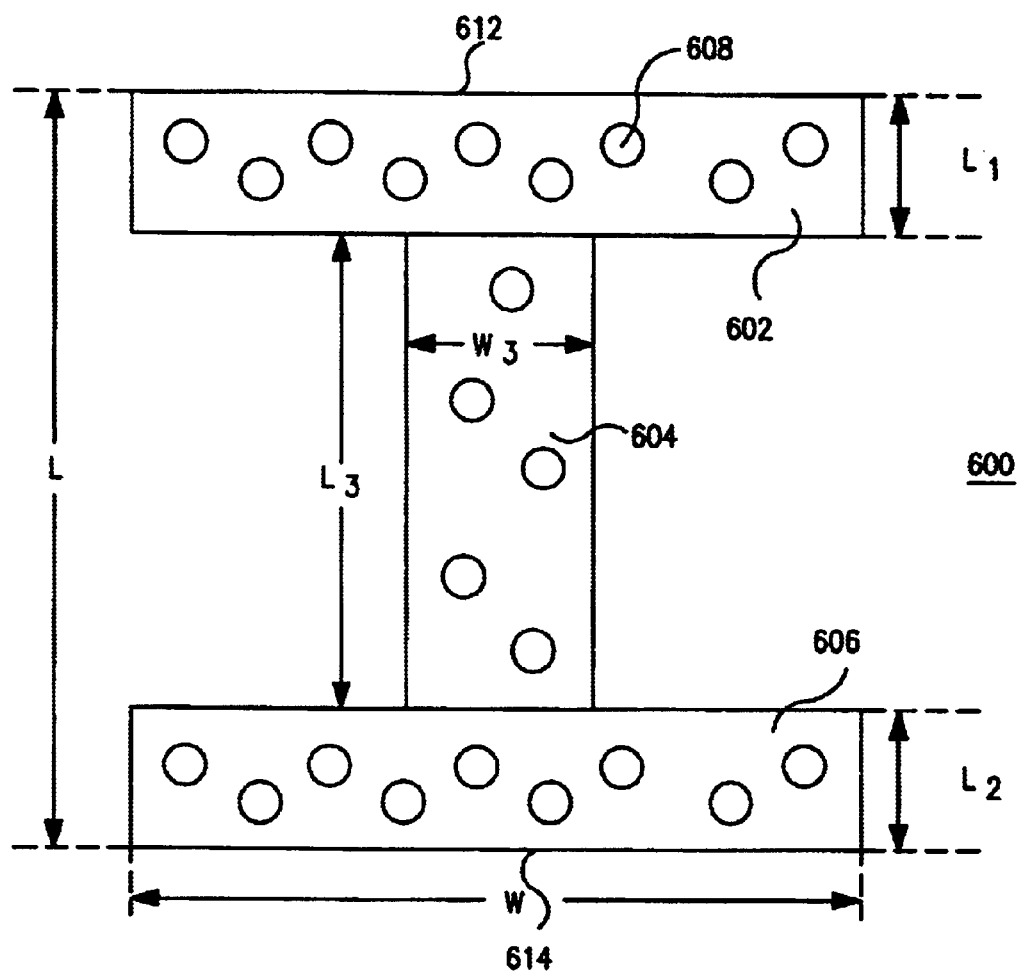
FIG. 6 is a schematic view of an alternative embodiment of a planar member for use in a structured packing element according to the present invention.

Aside from varying the number of perforations, the open area of the planar member may further be adjusted by using a variety of appropriate shapes or designs. FIG. 6 is a schematic illustration of another embodiment of a planar member 600 that can be used with corrugated sheets in forming a structured packing element. The planar member 600 has an I-shaped design, and comprises generally of an upper portion 602 and a lower portion 606 both adjoining a middle portion 604. For example, the upper and the lower portions 602 and 606 may have widths W approximately equal to those of adjacent corrugated sheets, and lengths L1 and L2 that are each preferably less than about one third, more preferably less than about one fifth, of the lengths of adjacent corrugated sheets. The middle portion 604, delineated from the upper and lower portions 602 and 606 by dotted lines in FIG. 6, is characterized by a length L3 and a width W3. The open area of planar member 600 is thus given by the total contributions from the areas of all perforations 608 and the area given by the product of (W−W3)×L3.

In the illustration of FIG. 6, perforations 608 are provided for all three portions 602, 604 and 606 of the planar member 600. In another embodiment, the planar member 600 may be imperforated—i.e., without any perforations. Furthermore, the number of perforations 608 may also be distributed differently in different portions of the planar member 600 in order to achieve various flow characteristics. For example, it may be desirable to provide perforations 608 only in the middle portion 604 of the planar member 600, with few perforations, if any, in the upper and lower portions 602 and 606. Such an embodiment, with a relatively large open area between the upper and lower portions 602 and 606, can be designed to resemble the embodiment previously shown in FIGS. 2–3. One advantage of this design is that the single-piece construction of the planar member 600 can facilitate assembly of the structured packing element because it is not necessary to perform separate alignments of the upper and lower planar members with respect to adjacent corrugated sheets. In one embodiment, for example, the planar member 600 preferably has a total length L that is substantially equal to the length of adjacent corrugated sheets, and is positioned between adjacent corrugated sheets such that its uppermost horizontal edge 612 and lowermost horizontal edge 614 (also referred to as outermost horizontal edges) are respectively proximal to upper and lower horizontal edges of the adjacent corrugated sheets. The embodiment of FIG. 6 is meant to be illustrative of alternative designs that may be useful for both improved performance and ease of fabrication or assembly of the structured packing element. Other designs can include more than one middle portion in the single-piece planar member, which may provide additional structural stability in cases where the ratio of W:W3 is relatively large.

In addition to the packing elements having linear corrugations described above, the present invention can also be practiced with corrugated sheets of varying configurations. For example, corrugated sheets with curved corrugations near the top and bottom of the sheets but straight corrugations near the middle, or those having other non-linear corrugations, may also be used in practicing embodiments of the present invention.

Figure 7A:
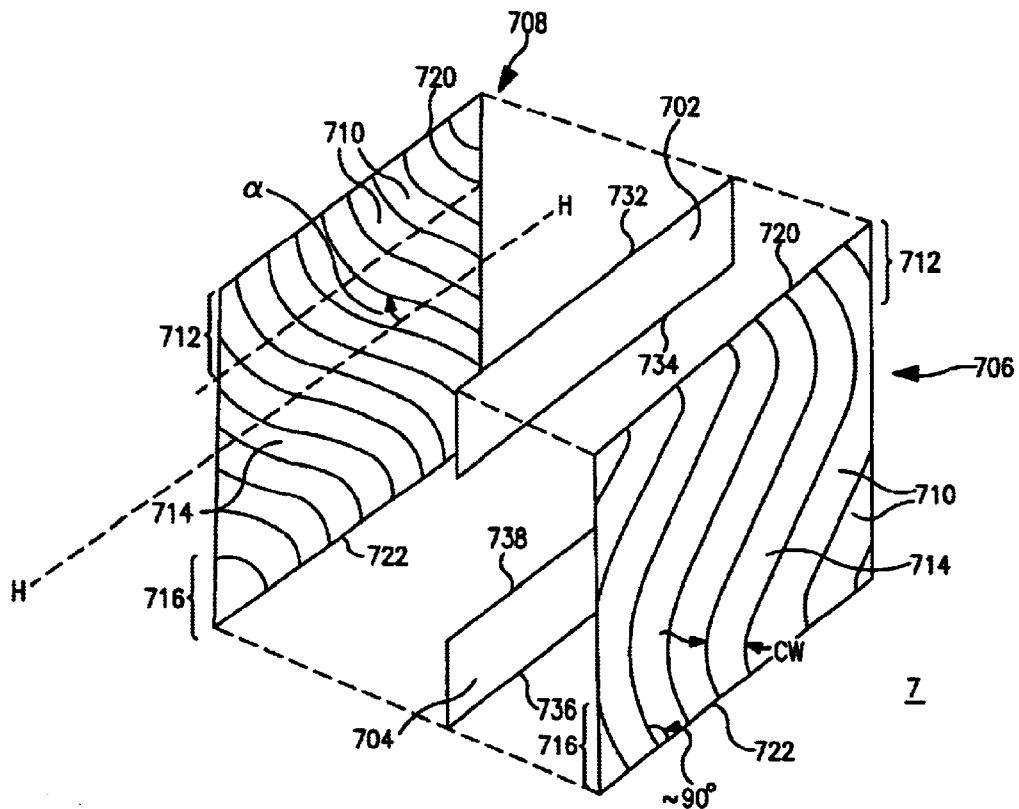
FIG. 7a is a partial exploded view of a corrugation sheet with varying corrugation angles that can be used with planar members for practicing embodiments of the invention.
Figure 7B:
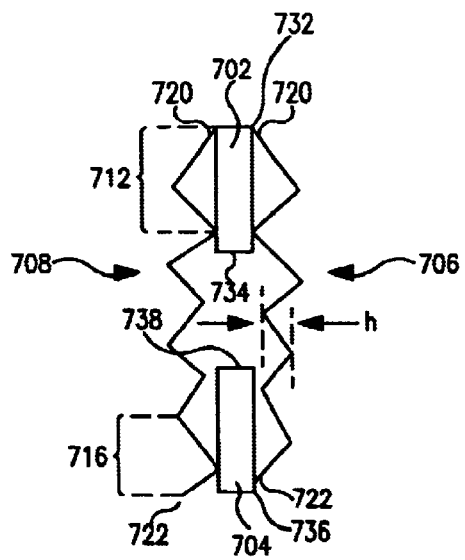

FIGS. 7a–b show a partial exploded view and a side view of a structured packing element 7 comprising planar members 702 and 704 disposed adjacent to corrugated sheets such as those found in MELLAPAKPLUS™ 752.Y packing. Various versions of MELLAPAKPLUS packings are available from Sulzer Chemtech Ltd., Winterthur, Switzerland. Details of a MELLAPAKPLUS packing have been disclosed in a PCT International Patent Application, WO 97/16247, published on May, 9, 1997, and in European Patent Specification EP 858,366B1, granted on Jul. 26, 2000, both of which are incorporated herein by reference.

FIG. 7a shows corrugated sheets 706 and 708 each having a series of corrugations 710 disposed at an angle that is different between a middle portion 714 and the terminal portions 712 and 716 (or upper and lower portions) of the corrugated sheets 706 and 708. In general, corrugations 710 can be characterized by an angle of inclination $\alpha$, which is the acute angle between corrugations 710 and a horizontal axis HH'. Within the middle portion 714, this angle of inclination has a uniform or constant value less than 90°, e.g., 45° or 60°, but increases progressively within the upper and lower portions 712 and 716 such that the corrugations 710 intersect an upper horizontal edge 720 and a lower horizontal edge 722 of the corrugated sheet 706 substantially perpendicularly, i.e., with angle of inclination $\alpha$ at about 90°. However, it is also acceptable to have corrugations 710 intersecting the upper and/or lower horizontal edges 720 and 722 at an angle ranging from about 80° to about 90°.

As shown in FIG. 7b, planar members 702 and 704 are held in place, within the same vertical plane as each other, by contact with adjacent corrugated sheets 706 and 708, and are respectively positioned adjacent to the upper and lower portions 712 and 716, with outermost horizontal edges 732 and 736 proximal to horizontal edges 720 and 722 of corrugated sheets 706 and 708. In one embodiment, both planar members 702 and 704 have a length of about 35 mm, such that their innermost edges 734 and 738 extend beyond the upper and lower portions 712 and 716 of corrugated sheets 706 and 708. In general, the length (l) of the planar members 702 and 704 should at least be about two times the corrugation width CW of corrugations 710, and preferably less than about one third, more preferably less than about one fifth, of the length of the corrugated sheets 706 and 708. Although FIGS. 7a–b show the use of two planar members 702 and 704 in an upper and lower configuration, it is also possible to use only one planar member, preferably adjacent to the lower portions 716 of the corrugated sheets 706 and 708.

Aside from the specific embodiments illustrated above, many other possible variations in the corrugated sheets may be used for practicing embodiments of the present invention. For example, it is possible to have corrugations 710 with angles of inclination that vary progressively within substantially the entire length of the corrugated sheet, or corrugations 710 intersecting the upper or lower edges 720 and 722 with angles of inclination less than 90°, e.g., from about 80° to about 90°. Although corrugations 710 usually have uniform height (h, shown in FIG. 7b) from the top to bottom portions 712 and 716, those having non-uniform heights may also be acceptable. Furthermore, in the vicinity of at least one of the upper or lower edges 720 and 722 of the structured packing element 7, corrugations 710 may have reduced cross-sections (not shown) for reducing the surface area and pressure drop at these locations, i.e., close to the interfaces with adjacent structured packing elements. Such reduced cross-sections may be accomplished, for example, by reducing the height or depth of the corrugations 710, or by changing the cross-sectional shape of the corrugations. In sum, different modifications of the configuration of corrugated sheets, including for example, the angle of inclination of corrugations, corrugation height, corrugation width, cross-sections of the corrugations, or surface texture, may be advantageously used in conjunction with planar members according to the present invention for improved performance in the structured packings.

According to embodiments of the invention, it is generally preferable that at least one planar member be positioned between each pair of adjacent corrugated sheets, e.g., at least one planar member alternating with each corrugated sheet. However, it is understood that improved performance in the structured packing can still be achieved even if planar members are missing between some pairs of adjacent corrugated sheets. Thus, it is possible to practice embodiments of the present invention using a structured packing element having planar members positioned between at least a majority of pairs of adjacent corrugated sheets.

Figure 8:
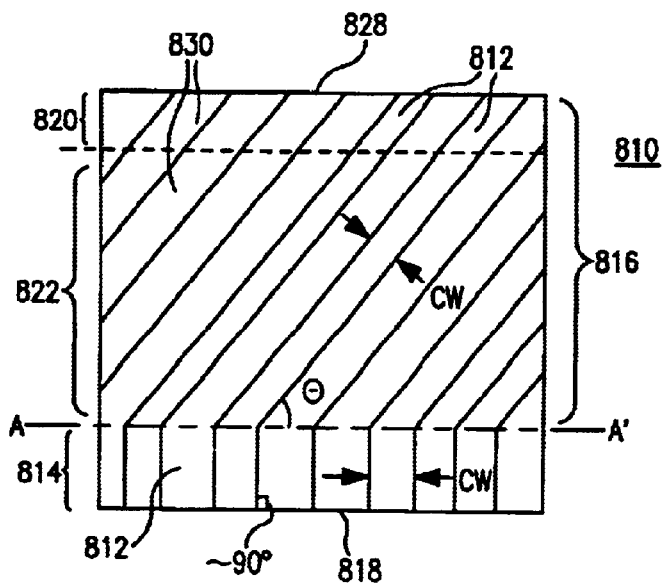
FIG. 8 is a schematic illustration of a corrugated sheet with different corrugation angles that can be used with planar members according to embodiments of the invention.
Figure 9:
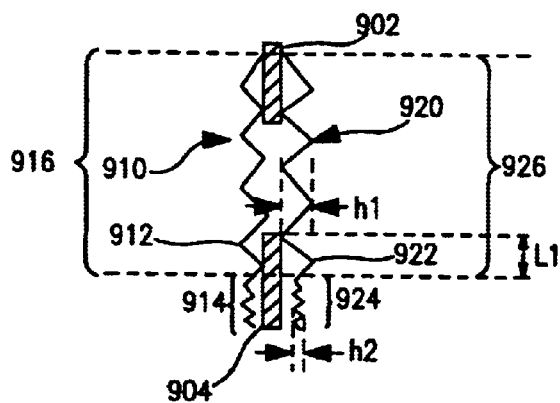
FIG. 9 is a schematic illustration of a side view of one embodiment incorporating two planar members between corrugated sheets with reduced corrugation heights.

FIGS. 8–10 illustrate schematically other corrugated sheets that may be used with one or more planar members as previously described to practice embodiments of the present invention. Details of other configurations of corrugated sheets are disclosed in U.S. Pat. No. 5,632,934, issued May 27, 1997, and in U.S. Pat. No. 5,921,109, issued Jul. 13, 1999; both of which are herein incorporated by reference in their entirety. One structured packing element incorporating these corrugated sheets is the FLEXIPAC®HC™ packing, which is available from Koch-Glitsch, Inc., of Wichita, Kans. These various designs of corrugations in the corrugated sheets are directed towards reducing pressure drops near the interface between adjacent packing elements.

FIG. 8 illustrates a schematic front view of a corrugated sheet 810 having rectilinear corrugations 812 made up of linear segments in different portions of the corrugated sheet 810. Each of the rectilinear corrugations 812 is characterized by at least one angle of inclination $\theta$, which is the acute angle between a longitudinal axis of the rectilinear corrugation 812 and a horizontal axis AA'. In this embodiment, the corrugations 812 have a first angle of inclination less than 90°, which remains constant within a first portion 816 of the corrugated sheet 810. There is a relatively abrupt change in the angle of inclination of some of the rectilinear corrugations 812 between the first portion 816 and the lower portion 814 of the corrugated sheet 810. At the lower portion 814, rectilinear corrugations 812 are oriented substantially perpendicular to the lower horizontal edge 818 of the corrugated sheet 810. Such a configuration also reduces the gas velocity, and thus the pressure drop, at the interface between a structured packing element containing these corrugated sheets 810 and an adjacent packing element (not shown) that is positioned below the structured packing element with corrugated sheets 810. It is further understood that there are also other corrugations on the corrugated sheet 810, e.g., those labelled as 830, that neither show an abrupt change in the angle of inclination, nor extend to the lower portion 814.

In practicing embodiments of the present invention, structured packing elements are preferably formed by using corrugated sheets 810 in conjunction with either a single planar member adjacent to the lower portion 814 of the corrugated sheets, or two planar members in an upper and lower configuration. When two planar members are employed in the upper and lower configuration, the upper planar member is aligned with its upper horizontal edge proximal to upper horizontal edges 828 of two adjacent corrugated sheets 810, while the lower planar member is aligned with its lower horizontal edge proximal to lower horizontal edges 818 of the adjacent corrugated sheets 810. In either embodiment, the planar member located adjacent the lower portion 814 should preferably have a minimum length (in a vertical direction) equal to at least about two times the corrugation width (CW) for the rectilinear corrugations 812 at the lower portion 814. Note that due to the difference in angles of inclinations, the rectilinear corrugations 812 in portions 814 and 816 are characterized by slightly different corrugation widths (CW), each of which corresponds to the distance defined from peak to peak or trough to trough, as measured perpendicular to the respective longitudinal axes of the corrugations. In yet another embodiment, rectilinear corrugations 812 may also have an angle of inclination in an upper portion 820 that is equal to about 90° (not shown), with the angle of inclination in a middle portion 822 remaining constant at some angle of inclination less than 90°.

FIG. 9 illustrates a schematic side view of another embodiment of the present invention, in which upper and lower planar members 902 and 904 are disposed between and in contact with corrugated sheets 910 and 920. In this configuration, linear corrugations 912, 922 have constant angles of inclination throughout the entire corrugated sheets 910 and 920, but are provided with reduced corrugation heights h2 at the lower portions 914, 924 compared to the corrugation heights hi at the remaining portions 916, 926 of the corrugated sheets 910 and 920. If a single planar member is used, it is preferable that the planar member be disposed adjacent to the lower portions 914, 924 of corrugated sheets 910 and 920. In either embodiments, the lower planar member 904 should be sufficiently long (in vertical direction) so as to extend between and in contact with corrugations in the remaining portions 916 and 926 of the corrugated sheets. The length of the planar member 904 extending above the lower portions 914 and 914 (L1) should preferably be equal to at least about two times the corrugation width for the linear corrugations 912 and 922.

Figure 10A:
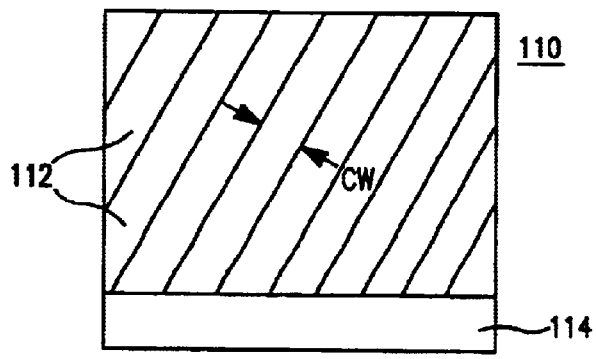
FIG. 10a is a schematic front view of another corrugated sheet with a modified bottom portion that can be used with planar members according to embodiments of the invention.
Figure 10B:
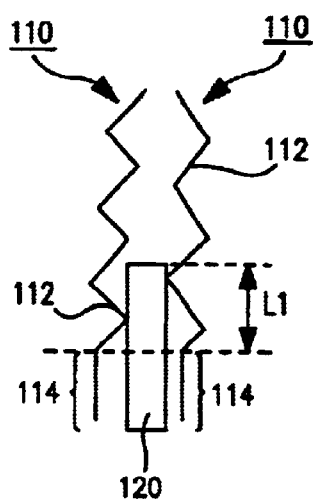

FIGS. 10a–b illustrate a schematic front view and a side view of yet another configuration of a corrugated sheet 110, in which the corrugations 112 terminate above a bottom portion 114. As such, the bottom portion 114 has a flat configuration, i.e., without any corrugations. One or more planar members such as those previously described may be used with corrugated sheets 110 to form structured packing elements for use in various distillation applications. Again, if only one planar member is used, it is preferably positioned adjacent to the bottom portions 114 of adjacent corrugated sheets 110, as shown in FIG. 10b. The lower planar member 120 should be sufficiently long (in the vertical direction) to extend between and be in contact with corrugations 112, and the length of the lower planar member 120 extending above the bottom portion 114 (indicated as L1 in FIG. 10) should again be equal to at least two times the corrugation width for the corrugations 112.

Finally, embodiments of the present invention may further be practiced by incorporating planar members previously described with other variations of corrugated sheet designs, such as MONTZ™-Pak B1-350 and MONTZ™-Pak B1-350M, available from Julius Montz, of GmbH, Hilden, Germany, described by Olujic et al. in "Stretching the Capacity of Structured Packings", presented at the Annual Meeting of the American Institute of Chemical Engineers, Nov. 14, 2000, in Los Angeles, Calif.

It has been found that a structured packing, such as packings with structured packing elements 2, 5 and 7 designed in the manner set forth above, functions with the same or a higher HETP than structured packings of the prior art. This is surprising considering the fact that the packing with the intermediate planar members has a greater surface area than similar packing not incorporating such planar members, and as such, would be expected to have a lower HETP. A further unexpected feature is that packings of structured packing elements 2, 5 and 7 of the present invention flood at higher vapor rates. There are various criteria that are used to describe the flooding condition, for instance, excessive pressure drop. In all cases if HETP is plotted against F-Factor (where F-Factor is a product of the superficial vapor velocity and the square root of the vapor density) flooding is evidenced by a rapid rise of the slope of the curve. Such a rise in HETP is indicative of the vapor supporting the descending liquid thereby choking the column and disrupting the separation. This increase in the flooding point allows higher flow rates through the column and therefore for a given volume of packing, greater production. This allows for thinner columns using less packings or columns that can handle a greater throughput. The reason for such operation is that the planar members of the present invention are believed to inhibit turbulence in the vapor flow ascending through the structured packing. In addition, the planar members provide both additional surface area near the bottom of a packing layer for the descending liquid to spread out upon and additional contact points between the upper and lower layers of packing at their common interface. These attributes of the planar members are believed to lessen the resistance to liquid flow from the upper to the lower packing layers. This decreases the hold-up of liquid at the interface and allows the column to operate at a higher capacity.

Structured packings comprising packing elements 2 and 5 (shown in FIGS. 2–3 and FIG. 5 respectively) were tested against structured packing obtained from Sulzer Chemtech Ltd, Winterthur, Switzerland, as model MELLAPAK® 500.YL. This packing has a density of about 500 $m^2/m^3$. The structured packings 2 and 5 were then fabricated out of corrugated sheets that would otherwise have had the same density but for planar members 70, 72, and 80, respectively, and therefore were of slightly greater density. A greater separation efficiency was therefore to have been expected.

Testing, however, showed that with the type of mixtures to be separated in an air separation plant, either in a lower pressure column, such as lower pressure column 26, or in an argon column, such as argon column 12, at operational ranges of F-Factor prior to flooding, structured packing 2 had an HETP of about 15% greater than the MELLAPAK 500.YL packing. Structured packing 5 (more dense than structured packing 2) had an HETP of about 25% greater than the MELLAPAK 500.YL packing. Moreover the flooding points of structured packings 2 and 5 were about 25% and about 40% greater than the MELLAPAK 500.YL packing.

For both structured packing elements 2 and 5, the addition of planar members to MELLAPAK 500.YL increased the structured packing's capacity at the expense of a loss in separation efficiency. Those skilled in the art will recognize this as an accepted trade-off in packing design, i.e., higher capacity packings generally have lower separation efficiencies and vice versa.

However, a surprising result was obtained when planar members were incorporated into MELLAPAKPLUS 752Y packing to obtain structured packing element 7. For the separation of argon from a mixture of argon and oxygen at 1.6 bara using structured packings comprising packing element 7, the capacity was found to increase by about 20% above that of MELLAPAKPLUS 752Y, without any appreciable loss in separation efficiency. This result is surprising especially in light of the results obtained with structured packing elements 2 and 5, and might suggest the presence of a synergy between the corrugation channels with end geometry modifications (e.g., configurational changes near the terminal portions of the corrugated sheets) and the use of planar members. Based on the results obtained with structured packing element 7, similar results would thus be expected for other embodiments described herein which incorporate other end geometry modifications.

In addition to the obvious advantage of allowing smaller distillation columns to be used to achieve a specified production rate in the design of new commercial plants, this packing has the added advantage of being useful in retrofit applications. For example, the production rate of a commercial plant which uses a distillation column packed with MELLAPAKPLUS 752Y could be increased by about 20% simply by replacing the packing with structured packing comprising packing elements 7. In retrofit applications, only a packing with the same or lower HETP could be used to enhance the capacity of the distillation column. Thus, unlike packings with structured packing elements 7, those with structured packing elements 2 and 5 would not be suitable candidates for such applications.

The structured packing elements of the present invention have been illustrated for use in air separation applications. These structured packing elements can also be used for the separation of argon and oxygen in a distillation column. Details of a cryogenic process for argon and oxygen recovery using a distillation column with structured packings have been disclosed in U.S. Pat. No. 4,871,382, issued Oct. 3, 1989, which is incorporated herein by reference. However, these structured packings can also be employed in numerous distillation applications such as in chemical and petroleum separations.

While the present invention has been described with reference to several embodiments, as will occur to those skilled in the art, numerous changes, additions and omissions may be made without departing from the spirit and scope of the present invention.

We claim:

1. A structured packing element comprising:
    an array of vertically oriented corrugated sheets having perforations;
    each of said corrugated sheets having a top portion, a middle portion and a bottom portion, all of said portions having corrugations at an angle of inclination from horizontal;
    at least some of said corrugated sheets having corrugations with angles of inclination in said middle portion that are smaller than angles of inclination in at least one of said top and bottom portions; and
    one or more planar members positioned between at least one pair of adjacent corrugated sheets, and at least one outermost horizontal edge of said planar members being situated proximal to a horizontal edge of said pair of adjacent corrugated sheets each of said corrugations having a corrugation width and each pair of adjacent corrugated sheets having at least one planar member positioned therebetween and said at least one planar member having a length shorter than a length of said each pair of adjacent corrugated sheets but equal to at least two times said corrugation width of said corrugations.

2. The structured packing element of claim 1, wherein said outermost horizontal edge of said at least one planar member is a bottom edge thereof.

3. The structured packing element of claim 1, wherein at least a majority of pairs of adjacent corrugated sheets have two planar members positioned therebetween and said two planar members each have a length that is shorter than a length of said majority of pairs of adjacent corrugated sheets.

4. The structured packing element of claim 3, wherein said length is between about two and about eight times said corrugation width.

5. The structured packing element of claim 3, wherein at least said majority of pairs of adjacent corrugated sheets have a first planar member facing said top portions and a second planar member facing said bottom portions of said adjacent corrugated sheets.

6. The structured packing element of claim 5, wherein said first planar member has substantially the same length as said second planar member, and said first and second planar members have respective outermost horizontal edges situated proximal to respective upper and lower horizontal edges of said pair of adjacent corrugated sheets.

7. The structured packing element of claim 1, wherein said corrugations in said middle portions of each of said corrugated sheets have angles of inclination in a range of about 30° to about 60°.

8. The structured packing element of claim 1, wherein said corrugations in at least one of said top and bottom portions have angles of inclination in a range of about 80° to about 90°.

9. The structured packing element of claim 1, wherein said angle of inclination from horizontal within at least one of said top and bottom portions increases progressively to about 90°.

10. The structured packing element of claim 1, used as part of a structured packing in a method of cryogenic separation of a fluid mixture comprising argon and oxygen within a distillation column operating at cryogenic temperatures, comprising:
    forming descending liquid and ascending gaseous phases of said fluid mixture within said distillation column;
    contacting said descending liquid and ascending gaseous phases of said fluid mixture within the structured packing contained within at least one section of said distillation column;
    wherein said descending liquid becoming ever more rich in oxygen as it descends through said structured packing, and said gaseous phase becomes ever more rich in argon as it ascends through said structured packing.

11. A structured packing element comprising:
    an array of vertically oriented corrugated sheets having perforations;
    each of said corrugated sheets having a top portion, a middle portion and a bottom portion, all of said portions having corrugations at an angle of inclination from horizontal;

at least some of said corrugated sheets having corrugations with angles of inclination in said middle portion that are smaller than angles of inclination in at least one of said top and bottom portions;

one planar member positioned between at least a majority of pairs of adjacent corrugated sheets and said planar member having a length that is substantially equal to a length of said majority of pairs of adjacent corrugated sheets; and each of said one plane member having perforations at least at a center portion of said one planar member, and said perforations constituting an open area of said one planar member.

12. The structured packing element of claim 4, wherein said open area constitutes from about 20% to about 60% of a total area of said one planar member.

13. A structured packing element comprising:

an array of vertically oriented corrugated sheets having perforations;

each of said corrugated sheets having a top portion, a middle portion and a bottom portion, all of said top, middle and bottom portions having corrugations at an angle of inclination from horizontal;

at least some of said corrugated sheets having corrugations with angles of inclination in said middle portion that are smaller than angles of inclination in at least one of said top and bottom portions;

one planar member positioned between at least a majority of pairs of adjacent corrugated sheets and said planar member having a length that is substantially equal to a length of said majority of pairs of adjacent corrugated sheets; and said one planar member comprises a top portion, a bottom portion and at least one middle portion adjoining said top and said bottom portions; said top and said bottom portions each having a width that is larger than a length; and said at least one middle portion having a length larger than a width.

14. The structured packing element of claim 13, wherein said at least one planar member is perforated and said length of said top and said bottom portions is between about two and about eight times said corrugation width.

* * * * *